United States Patent [19]

Lewiner et al.

[11] Patent Number: 4,678,897
[45] Date of Patent: Jul. 7, 1987

[54] PROCESSES AND DEVICES FOR READING MAGNETIC ACCESS CONTROL CARDS OR SIMILAR

[76] Inventors: Jacques Lewiner, 5, rue Bory d'Arnex, 92210 Saint Cloud; Claude Hennion, 18, rue Flatters, 75005 Paris, both of France

[21] Appl. No.: 605,810
[22] Filed: May 1, 1984
[30] Foreign Application Priority Data May 6, 1983 [FR] France ............................ 83 07626

[51] Int. Cl.$^4$ .............................................. G06K 7/00
[52] U.S. Cl. ...................................... 235/436; 235/474
[58] Field of Search ........................ 235/436, 466, 474

[56] References Cited

U.S. PATENT DOCUMENTS

| 3,752,963 | 8/1973 | Herrin | 235/466 X |
| 3,882,301 | 5/1975 | Nassimbene | 235/466 X |
| 3,887,793 | 6/1975 | Goodfinger et al. | 235/436 |
| 3,959,626 | 5/1976 | Vinal |  |
| 4,096,378 | 6/1978 | Vinal | 235/466 |
| 4,158,436 | 6/1979 | Vanderheyden | 235/466 |

OTHER PUBLICATIONS

Improved Reader for Magnetically Encoded ID cards; Tech Briefs; Computer Design, Jan. 1981, vol. 20, No. 1, pp. 148, 149.

Primary Examiner—David L. Trafton
Attorney, Agent, or Firm—Larson and Taylor

[57] ABSTRACT

For reading a coded sequence of magnetic signals recorded on a card, which sequence is formed of bits of identical duration the reading of which results, for the 0s, in a single change of level of an electric voltage, and for the 1s, in two such changes evenly spaced apart in time, the real duration of each bit read is measured, and the time of identification of each bit is adjusted depending on the real duration $t_0$ of the preceding bit and on the nature of this preceding bit by giving to the time interval T which separates the end of reading of this preceding bit and the time of identifying the following bit, if the preceding bit is a 1, a value $T_1$ equal to ⅝ of $t_0$ or to 11/16 of $t_0$ and if the preceding bit is a 0, a value $t_0$ equal to ⅝ of $t_0$, or else equal to 13/16 of $t_0$ if the bit preceding the above 0 was again a 0 and to 15/16 of $t_0$ in the opposite case.

10 Claims, 2 Drawing Figures

PROCESSES AND DEVICES FOR READING MAGNETIC ACCESS CONTROL CARDS OR SIMILAR

FIELD OF THE INVENTION

The invention relates to processes and devices for reading coded successions of magnetic signals recorded on appropriate carriers such as cards for controlling accesses, said successions being formed of bits of identical duration the reading of which results respectively, for some—which will be assumed to be zeros in what follows—by a single change of level of an electric voltage or other given parameter and, for the others—which will be assumed to be ones—by two level changes of said parameter evenly spaced apart in time.

Such known successions are sometimes known as "frequency doubling" successions F2F.

The magnetic carriers of the kind considered—which will be called "cards" in what follows for the sake of simplification but of course in a non limitative way for it could be a question of carriers other than cards, such as flat keys, rods . . . —are used for example for controlling the unlocking of doors giving access to controlling closures such as cabinets containing money distributing control panels, garages, hotel rooms . . . .

So that the reading of the coded magnetic sequences recorded on these cards is correct, it is necessary, in the actual embodiments, to take into account the speed at which the cards to be read travel past the reading heads.

In fact, in the opposite case, the reading may be falsified due to a change of speed which is too high in introducing the card to be treated in the reading apparatus: such a change of speed, which may go as far as a temporary complete stop of the introduction movement, is for example due to the hesitation of the holder of the card regarding the exact method of using same.

To this end, it has already been proposed to
either motorized drive means arranged so as to snatch the card introduced into the reading apparatus and impose thereon a constant introduction speed,
or tachymetric means adapted for detecting at all times the real speed of introduction of the card and to deliver appropriate signals for automatically compensating the variations of this speed.

These means are costly and cumbersome.

To overcome the need of using such means, it has also been proposed by U.S. Pat. Nos. 3,959,626 and 4,096,378 to measure the real overall duration of each bit read and to adjust the moment of identification for reading each bit as a function of the real overall duration of the preceding bit or of the real overall durations of the two preceding bits.

With such a process, the values and variations of the speed at which the cards travel past the reading heads can be automatically taken into account.

But this process takes no account of the contents (0 or 1) of these preceding bits, such contents only being taken into consideration, according to the patents considered, for compensating, during the reading of each coded signal recorded on the card, a possible "spreading out" of this signal due for example to printing smudges.

DESCRIPTION OF THE PREFERRED EMBODIMENT

With reference to the figures, if the duration of each bit is $t_o$, a bit "0" can be represented as a rectangular signal A (FIG. 2) having only a transition at the end of the period $t_o$ and a bit "1" can be represented as a rectangular signal B (FIG. 1) having a first transition at $t_o/2$ and a second transition at the end of $t_o$.

Now, the applicants have discovered that, because of the particular shapes of the reading signals of the successive bits and their subsequent deformation in the amplification and shaping means of the reading apparatus, the moment when the identification of each bit is optimum, that is to say combines the greatest number of chances of correctly identifying the bit being read, is not the same depending on whether the bit read previously was a 0 or a 1 and even, in the case where the previously read bit was a 0, depending on whether the bit preceding this 0 was itself a 0 or a 1.

Thus, contrary to what might be expected, the time T separating the end of the reading of any given bit, of duration $t_o$—called "preceding bit" hereafter—and the optimum reading time S (FIG. 1) for identifying the following bit is not equal to 0.75 $t_o$, for which value said time would have been situated exactly midway between 0.5 $t_o$ and $t_o$.

According to the invention, this time T is given:
if said preceding bit is a 1, a value $T_1$ between 0.6 $t_o$ and 0.75 $t_o$,
and if said preceding bit is a 0, a value $T_o$ between 0.75 $t_o$ and 0.9 $t_o$.

In preferred embodiments,
the value $T_1$ is equal to $\frac{2}{3}$ of $t_o$ (arrow G in FIG. 1) or to 11/16 of $t_o$,
the value $T_o$ is equal to $\frac{5}{6}$ of $t_o$ (arrow H in FIG. 2), or else, when the "preceding bit" is a 0—called hereafter "preceding 0"—the value $T_o$ is equal to 13/16 of $t_o$ if the bit preceding the preceding 0 was again a 0 and to 15/16 of $t_o$ if said bit preceding the preceding 0 was on the contrary a 1.

Figure 1:
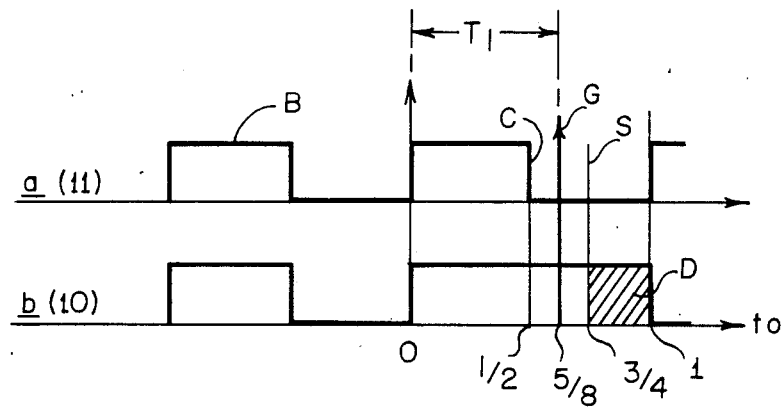
FIG. 1 illustrates the general form of signals occurring at a reading station where a bit "1" is followed in waveform a, by a bit "1", and in waveform b, by a bit "0".
Figure 2:
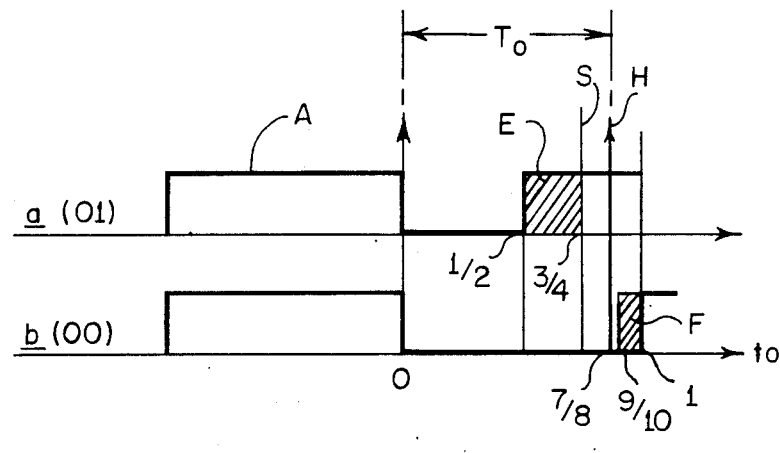
FIG. 2 illustrates the general form of signals occuring at a reading station where a bit "0" is followed in waveforms by a bit "1", and in waveformb, by a bit "0".

These values are chosen so as to place the read signal in an area of certitude and to avoid areas of incertitude, such as defined by areas C and D in FIG. 1 and by areas E and F in FIG. 2.

The solutions using $\frac{2}{3}$ are the simplest and the solutions using 1/16 are the most reliable.

Therefore, the reading of each sequence of bits recorded magnetically on a card gives rise to the following operations:
reading of each bit for identifying the nature of this bit and also for measuring its real duration,
automatic determination, according to the laws mentioned above, of the time of identification of each bit depending on the duration and nature of the bit which precedes it and possibly further on the nature of the bit preceding this last one.

The correct reading of the beginnings of the coded sequences of bits to be read is ensured because each of these sequences begins by a succession of identical bits of a predetermined kind, more especially a succession of 0s, which allows the starting time $t_o$ to be accurately determined.

Of course, the reading apparatus used for the above defined processes comprises the means required for measuring the real durations of the different bits and for ensuring the identification of each bit at the time defined according to the above laws, depending on the duration of the preceding bit and on the nature of this preceding bit and possibly further on the nature of the bit preceding said preceding bit.

The reading apparatus in question are associated with means for comparing each sequence of bits read with a reference sequence previously stored so as to deliver an appropriate control signal when this comparison reveals identity between the sequence read and the reference sequence.

This control signal, which is for example an electric voltage or current pulse, is used in any desirable way, more especially for unlocking and possibly opening a door giving access to a controlled enclosure.

Following which and whatever the embodiment adopted, means are provided for reading magnetic coded sequences of bits of the kind described above, and whose construction follows sufficiently from the foregoing.

These means have over those known heretofore the great advantage of ensuring correct reading whatever the speed and speed variations of the movements for introducing the cards carrying these sequences into the reading apparatus, without it being necessary to have recourse to special means for driving said cards and/or for the tachymetric detection of their introduction movements.

It should be noted in this connection that, in practice, the successive bits of the coded sequences to be read, which are recorded magnetically on the cards considered, are very close to each other so that each variation of the speed of the introduction of such a card cannot concern only a few bits: each variation in question is on the contrary spread out over a large number of successive bits, which confers thereon a relatively slow progressivity from each bit to the next one and allows correct average bit durations to be constantly elaborated despite the slight errors effecting the individual estimates of these durations, which errors are due to the deformations of the reading signals.

As is evident and as it follows moreover already from what has gone before, the invention is in no wise limited to those of its modes of application and embodiments which have been more especially considered; it embraces, on the contrary, all variations thereof.

We claim:

1. A process for reading coded sequences of magnetic signals recorded on cards or similar carriers, which sequences are formed of bits of identical duration the reading of which results respectively, for some—called 0 hereafter—by a single change of level of an electric voltage or other given parameter and, for the others—called 1 hereafter—by two changes of level of said parameter regularly spaced apart in time, according to which the real duration of each bit read is measured and the time of identification for reading each bit is adjusted depending on the real duration $t_o$ of the "preceding bit", characterized in that to time T which separates the end of reading of this "preceding bit" and said identification time is given:

if the preceding bit is a 1, a value $T_1$ between 0.6 $t_o$ and 0.75 $t_o$, and if said preceding bit is a 0, a value $T_o$ between 0.75 $t_o$ and 15/16 $t_o$.

2. The reading process as claimed in claim 1, characterized in that $T_1 = \frac{5}{8}$ of $t_o$.

3. The reading process as claimed in claim 1, characterized in that $T_1 = 11/16$ of $t_o$.

4. The reading process according to claim 1, characterized in that $T_o = \frac{7}{8}$ of $t_o$.

5. The reading process according to claim 1, characterized in that, when the "preceding bit" is a 0, called hereafter "preceding 0", $T_o$ is equal to 13/16 of $t_o$ if the bit preceding the preceding 0 was again a 0 and to 15/16 of $t_o$ if said bit preceding the preceding 0 was on the contrary a 1.

6. A reading apparatus for reading coded sequences of magnetic signals recorded on cards or similar carriers, which sequences are formed of bits of identical duration and the reading of which results for some by a single change of level of an electric parameter, hereinafter called "0", and for the others by two changes of level of said parameter, hereinafter called "1", respectively, regularly spaced apart in time, according to which the real duration of each bit is measured and the time of identification for reading each bit is adjusted depending on the real duration $t_o$ of the "preceding bit", said apparatus comprising means for measuring the real duration of each bit read and a means for adjusting the time of identification for the purpose of reading each bit depending on the real duration $t_o$ of the "preceding bit", characterized in that these adjustment means are arranged so as to give to the time T separating the end of reading of this "preceding bit" and said identification time, if the preceding bit is a 1, a value $T_1$ between 0.6 $t_o$ and 0.75 $t_o$, and if said preceding bit is a 0, a value $T_o$ between 0.75 $t_o$ and 15/16 $t_o$.

7. The reading apparatus according to claim 6, characterized in that $T_1$ is equal to $\frac{5}{8}$ or $t_o$.

8. The reading apparatus according to claim 6, characterized in that $T_1$ is equal to 11/16 of $t_o$.

9. The reading apparatus according to claim 6, characterized in that $T_o$ is equal to $\frac{7}{8}$ of $t_o$.

10. The reading apparatus according to claim 6, characterized in that, when the "preceding bit" is a 0, called hereafter "preceding 0", $T_o$ is equal to 13/16 of $t_o$ if the bit preceding the preceding 0 was again a 0 and to 15/16 of $t_o$ if said bit preceding the preceding 0 was on the contrary a 1.

* * * * *